United States Patent [19]

Meatabi

[11] 4,297,002
[45] Oct. 27, 1981

[54] ARRANGEMENT OF CYLINDER ELEMENTS FOR A LENS BARREL

[75] Inventor: Tsuneyo Meatabi, Sakai, Japan

[73] Assignee: Minolta Camera Kabushiki Kaisha, Osaka, Japan

[21] Appl. No.: 149,359

[22] Filed: May 13, 1980

Related U.S. Application Data

[63] Continuation of Ser. No. 6,973, Jan. 26, 1979, which is a continuation-in-part of Ser. No. 1,796, Jan. 8, 1979.

[30] Foreign Application Priority Data

Jan. 31, 1978 [JP] Japan .................................... 53-8881

[51] Int. Cl.³ ............................ G02B 7/02; G03B 3/00
[52] U.S. Cl. .................................... 350/255; 354/195; 354/286
[58] Field of Search ................ 354/195, 286; 350/187, 350/252, 255, 247, 257; 16/2, 108, 109

[56] References Cited

U.S. PATENT DOCUMENTS 3,254,585  6/1966  Gorey ................................. 350/255
4,030,113  6/1977  Obreschkow ....................... 354/286
4,110,008  8/1978  Uesugi et al. ................... 354/195 X

*Primary Examiner*—L. T. Hix
*Assistant Examiner*—Thomas H. Tarcza
*Attorney, Agent, or Firm*—Wolder, Gross & Yavner

[57] ABSTRACT

An arrangement of cylinder elements for a lens barrel includes a first cylinder element and a second cylinder element which is coupled to and carried within the first cylinder element. An annular ridge portion is carried on an outer peripheral surface of either the first or the second cylinder element. The peripheral surface which carries the annular ridge portion faces an outer peripheral surface of the other cylinder element. A reinforcing member is attached to the annular ridge portion for reinforcing the strength characteristics of the cylinder elements. The reinforcing member is annularly shaped and is made of a material which is stronger than the material of the cylinder element which carries the annular ridge portion to thereby structurally reinforce this cylinder element and prevent deformation of the cylinder elements upon the application of external forces.

17 Claims, 7 Drawing Figures

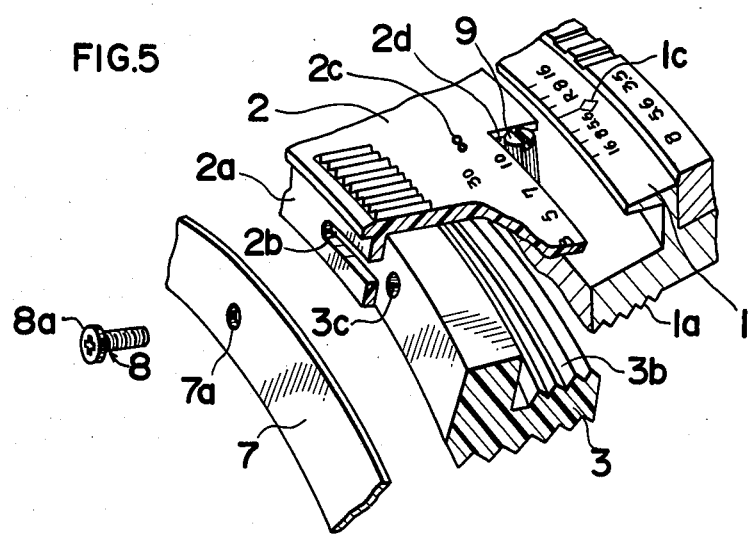
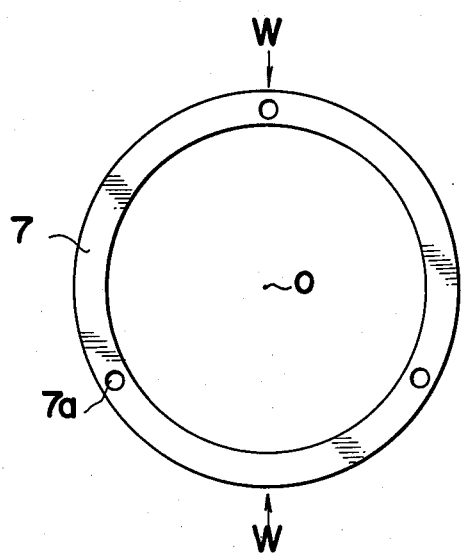
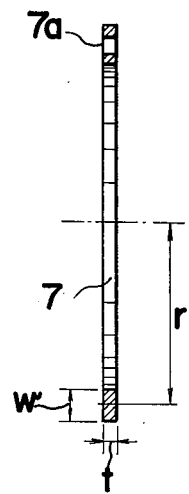

ARRANGEMENT OF CYLINDER ELEMENTS FOR A LENS BARREL

This is a continuation, of application Ser. No. 6,973 filed Jan. 26, 1979 which is a continuation-in-part of Ser. No. 1,796 filed Jan. 8, 1979.

BACKGROUND OF THE INVENTION

The present invention relates generally to the construction of a lens barrel for use in a camera, and more particularly to the arrangement of cylinder elements which form the structure of such a lens barrel.

The structure of a camera lens barrel typically includes a plurality of cylinder elements which are arranged in overlapping relation to each other. The innermost cylinder of this arrangement supports a lens to perform a photographic function. The various cylinders of the arrangement are mechanically interconnected so that when the outermost cylinder element is manually moved or adjusted, the innermost cylinder element will also be moved in response to the movement of the outermost cylinder element. If, as a result of any external forces applied to the arrangement, any of the cylinder elements should become distorted, frictional forces between the various cylinder elements will increase, thus preventing the smooth movement of the various cylinder elements.

In order to prevent such distortion, conventional lens barrels use metallic cylinder elements which have built up or enlarged radial wall thicknesses. This, however, tends to increase the weight of the lens barrel.

The foregoing disadvantage can be eliminated by either decreasing the wall thickness of the metallic cylinder elements, or by forming the cylinder elements out of a material which has a lower specific gravity than the typical metallic materials used.

Decreasing the wall thickness of the cylinder elements is generally unsatisfactory since this tends to increase the chances of deforming the cylinder elements even when a small external force is applied. Therefore, even though the weight of the lens barrel will be decreased by decreasing the wall thickness of the cylinder elements, the principal objective of preventing the cylinder elements from becoming deformed is not achieved.

Using cylinder elements made of materials having a lower specific gravity than metal will also tend to decrease the weight of the lens barrel. However, materials such as plastic are generally one third to one fifth the strength of the typical metallic materials and such plastic cylinder elements tend to be deformed more easily than metallic cylinder elements when external forces are applied to the arrangement of cylinders.

Cylinder elements which are made of plastic material therefore must have wall thicknesses which are significantly larger than the wall thicknesses of cylinder elements made out of metal in order for such elements to be equal in strength to the metallic cylinder elements. An increase in the wall thicknesses of the various cylinder elements causes the outer diameter of the lens barrel to be significantly enlarged, which is also an undesirable feature in lens barrels.

It is accordingly, a principal object of the present invention to provide an improved arrangement of cylinder elements for a lens barrel which generally overcomes the disadvantages of the prior art.

It is a more specific object of the present invention to provide an arrangement of cylinder elements which can produce a light weight lens barrel.

A further object of the present invention is to provide such an arrangement of cylinder elements for use in a lens barrel which can be made of metallic material having thin walls without increasing its susceptibility to deformation upon the application of external forces.

It is still a further object of the present invention to permit the use of cylinder elements made out of plastic material without increasing the overall size of the lens barrel while maintaining desired strength for the various cylinder elements.

Other objects, features and advantages of the invention will be apparent from the description of the invention in connection with the accompanying drawings, which will be described more fully hereinafter.

SUMMARY OF THE INVENTION

The foregoing objects of the invention are generally accomplished by providing an arrangement of cylinder elements for a lens barrel which includes a first cylinder element and a second cylinder element which is carried within the first cylinder element. An annular ridge portion is carried on an outer peripheral surface of either the first or second cylinder element, which surface faces an outer peripheral surface of the other cylinder element, and a reinforcing member which is attached to the annular ridge portion and is made of a material stronger than the material of the cylinder element which carries the annular ridge portion to thereby reinforce the strength characteristics of the cylinder elements.

BRIEF DESCRIPTION OF THE DRAWINGS

The present invention will be more specifically described with reference to the accompanying drawings, in which:

FIG. 5 is a perspective view illustrating essential parts of the present invention as shown in FIGS. 3 and 4;

FIG. 6 is a front elevational view of a flange used as a reinforcing member in the present invention; and FIG. 7 is a side elevational view of the flange illustrated in FIG. 6.

DESCRIPTION OF A PREFERRED EMBODIMENT

In order to more fully appreciate the present invention, the prior art will first be described in connection with FIGS. 1 and 2. In the following description, the manually movable distance setting ring 2 and the intermediate cylinder element 3, which serves to transmit movement of the distance setting ring to a next internal cylinder, are used as examples of "cylinder elements" which engage each other.

Figure 2:
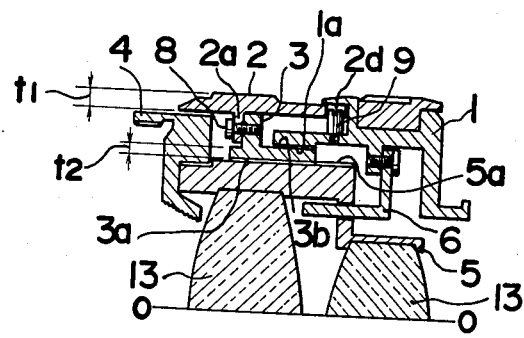
FIG. 2 is a vertical sectional view taken along lines A—A of FIG. 1.
Figure 3:
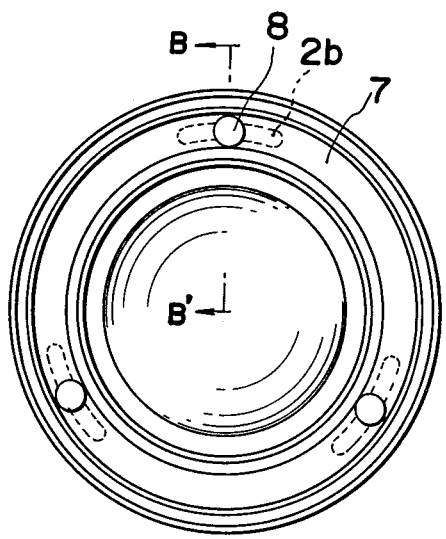
FIG. 3 is a front view similar to that of FIG. 1 illustrating an arrangement of cylinder elements of a lens barrel in accordance with the present invention.
Figure 4:
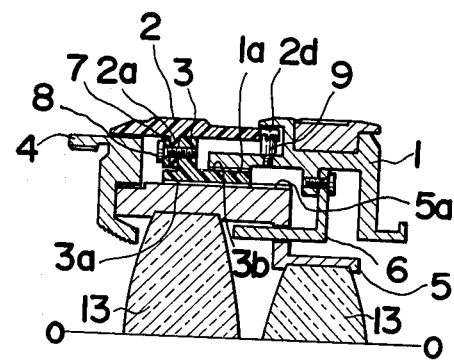
FIG. 4 is a sectional view taken along lines B—B of FIG. 3.

Referring now to FIG. 2, which illustrates in sectional view, the prior art arrangement of cylinder elements, a lens retaining cylinder 5, which carries a helical thread 5a on its outer cylindrical (circumferential) surface, retains a lens 13, which may be used for adjusting focal distance. Rotational movement of cylinder 5 is prevented by a straight guide key 6, which is connected to a fixed cylinder 1. Key 6 is guided for movement in a direction parallel to the optical axis O—O of the lens barrel. An intermediate cylinder 3 is provided with a helical thread 3a on its inner circumferential surface for engagement with helical thread 5a. The fixed cylinder 1 is constructed so as to be stationary. Fixed cylinder 1 cannot move in either the axial direction (i.e. parallel to the optical axis O—O) nor can it rotate about the optical axis. A distance setting ring 2 is rotatably mounted on fixed cylinder 1 for movement in a direction parallel to the optical axis O—O. An annular ridge portion 2a is carried on the inner circumferential surface of distance setting ring 2 and projects radially inward toward the center of the arrangement of cylinders. The intermediate cylinder 3 carries an outer annular ridge portion on its outer circumferential surface so as to be positioned in side-by-side relation with the annular ridge portion 2a of the distance setting ring 2. Intermediate cylinder 3 is coupled to the distance setting ring 2 by a screw 8 which extends through the annular ridge portion 2a and into a threaded opening in the outer annular ridge portion on the intermediate cylinder 3. Thus intermediate cylinder 3 will be moved as the distance setting ring 2 is moved as a result of the connection between them. A helical thread 3b is provided on the outer circumferential surface of intermediate cylinder 3 and a helical thread 1a provided on the inner circumferential surface of fixed cylinder 1 is positioned in cooperative engagement with helical thread 3b. Therefore, when distance setting ring 2 is rotated by external manual operation, intermediate cylinder 3, together with distance setting ring 2, will be guided by helical thread 1a on fixed cylinder 1 so as to move in an axial direction along optical axis O—O. Rotational and axial movement of intermediate cylinder 3 is thus transmitted through helical threads 3a and 5a to the lens retaining cylinder 5, which also therefore is caused to move in an axial direction along the optical axis to thus adjust the axial position of lens element 13 for focusing adjustment.

Figure 1:
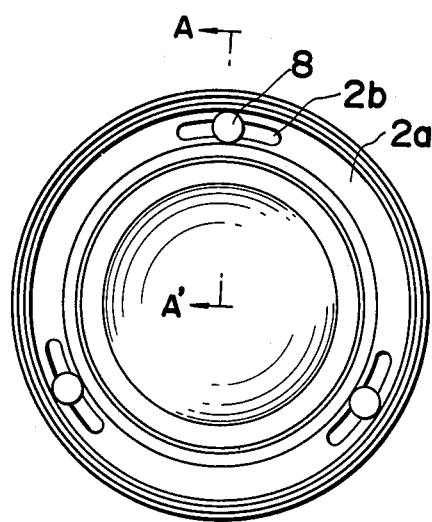
FIG. 1 is a front view of the prior art arrangement of cylinder elements forming a lens barrel.

As seen in FIG. 1, an arcuately shaped slot 2b is formed in ridge portion 2a for receiving screw 8. This permits adjustment of the relative angular position between the distance setting ring 2 and intermediate cylinder 3. Accordingly, as illustrated in FIG. 5, distance indications of index 1c on fixed cylinder 1 and graduations 2c on distance setting ring 2 can be matched to the actual distance of an object or scene upon which lens 13 is to be focused. A stopper 9 radially projects from the fixed cylinder 1 to control the rotational angle of the distance setting ring 2 relative to fixed cylinder 1. A lens barrel head ring 4 is also provided to prevent any dust from entering the lens barrel from the outside.

In the above described construction of the prior art, distance setting ring 2 and intermediate cylinder 3 are generally made of aluminum and brass. These materials are sufficient in strength to prevent distortion from occurring either in the distance setting ring or in the intermediate cylinder 3 when external forces are applied to the distance setting ring 2 during normal distance setting operations, provided the cylindrical walls of these elements have a minimum thickness to provide the strength characteristics needed to withstand such normal forces. Therefore, intermediate cylinder 3 will be smoothly guided by helical thread 1a on fixed cylinder 1, and lens retaining cylinder 5 will also be smoothly guided by helical thread 3a on the inner circumferential surface of intermediate cylinder 3.

As noted above, the use of metallic materials, such as aluminum and brass, tends to create an arrangement of cylinders which is objectionably heavy.

The wall thicknesses $t_1$ and $t_2$ of the distance setting ring 2 and the intermediate cylinder 3 can of course be made smaller to decrease the weight of the lens barrel and minimize the foregoing disadvantage. Decreasing the wall thicknesses of the distance setting ring 2 and intermediate cylinder 3, however, tend to structurally weaken these cylindrical elements, thus increasing the possibility that these elements will be deformed when even a small external force is applied to the arrangement of cylinders during normal distance setting operations to achieve focusing adjustment.

Alternatively, the distance setting ring 2 and the intermediate cylinder 3 may be made of plastic materials which generally have a lower specific gravity than the metallic materials out of which these elements are typically formed. Using plastic materials provides a number of advantages. These materials are generally lower in cost than metallic materials and the use of plastic materials also permits manufacturing of the cylindrical elements from a molding operation which also minimizes machining and manufacturing costs. Plastic materials, however, are typically from one third to one fifth the strength of metallic materials. Therefore, in order to compensate for the lower strength of these materials, it would be necessary to significantly increase the wall thicknesses $t_1$ and $t_2$ in order for the cylindrical elements made out of plastic material to have substantially the same strength characteristics if these elements were made out of metallic materials. Increasing these wall thicknesses will produce a lens barrel which is large in outer diameter and thus bulky. Although the weight problem may be solved in this manner, the lens barrel will have another disadvantage of being undesirably large in size.

The following description of the present invention is made with reference to FIGS. 3 through 7 in which the same reference numerals used in FIGS. 1 and 2 have been used to designate the same members or elements. To overcome the disadvantages of the prior art, the present invention provides an annular flange 7 which is coupled to the distance setting ring 2 and to the intermediate cylinder 3 when they are secured with screw 8. Flange 7 serves as a reinforcing member to prevent deformation of either the distance setting ring or the intermediate cylinder 3 when external forces are applied to the arrangement of cylinders. Accordingly, lighter weight materials may be used without materially increasing wall thicknesses, or metallic materials can continue to be used and their wall thicknesses decreased.

Flange 7 is constructed so that it may be mounted on or attached to annular ridge portion 2a of distance setting ring 2. Flange 7 is also made of a material which is stronger than the material used for the distance setting ring and the intermediate cylinder 3 to enable it to withstand external forces. In other words, reinforcement flange 7 could be made of metal while distance setting ring 2 and intermediate cylinder 3 may be made of plastic.

As noted in FIG. 7, the width w (radial width) is larger than the thickness t (axial direction). Also, flange 7 is provided with the three screw holes 7a to receive screw 8 for securing flange 7 to the distance setting ring 2 and the intermediate cylinder 3. As more clearly seen in FIG. 5, screw 8 will be placed in screw hole 7a on reinforcing flange 7 and secured in a screw hole 3c on intermediate cylinder 3 after extending through the arcuate slot 2b on annular ridge portion 2a of distance setting ring 2. Reinforcing flange 7, distance setting ring 2 and intermediate cylinder 3 are thus firmly secured together by screw 8.

It has been found that the following mathematical formula may be used to compute the amount of distortion of flange 7:

$$D = 12Wr^3/Etw^3$$

In the foregoing equation, t represents the axial thickness of the flange; w represents the radial ring width of the flange, D represents the amount of distortion which the flange will suffer when an external force W (as shown in FIG. 6) is applied to the flange; and E represents the modulus of elasticity of the material from which the flange is formed. From the foregoing equation, it will be clear that the amount of distortion D will become smaller when the radial width w becomes larger, D being inversely proportional to $w^3$. Since the amount of distortion D is also inversely proportional to the modulus of elasticity E, it will clearly be of advantage to select materials which have a large modulus of elasticity.

Reinforcing flange 7 is constructed so that its width w is larger than its thickness t, thereby preventing the distance setting ring 2 and the intermediate cylinder 3 from being distorted even when great external forces are applied. The use of the reinforcing flange 7 also serves to prevent screw head 8a from bending and also prevents the annular ridge portion 2a from cracking as a result of forces applied by screw 8 when the screw is secured in place in screw hole 3c. Reinforcing flange 7 is also constructed so that its outer circumferential edge will come into contact with the inner circumferential surface of distance setting ring 2 when the flange is mounted in place. Accordingly, the inner circumferential surface and the degree of roundness of distance setting ring 2 will be corrected by the outer circumferential edge of reinforcing flange 7. Improving the amount of roundness of distance setting ring 2 will minimize sliding contact between the inner circumferential surface of distance setting ring 2 and the outer circumferential surface of lens barrel head ring 4 during movement of the distance setting ring 2 even when both of these surfaces are minimally spaced apart. Thus the likelihood of any damage to either of these elements is minimized.

As noted above, the use of flange 7 as a reinforcing member functions to prevent the cylinder elements, i.e. the distance setting ring and the intermediate cylinder, from being deformed or distorted even when considerably great external forces are applied to them. Therefore, if the distance setting member 2 and intermediate cylinder 3 were to be made of metal, their wall thicknesses $t_1$ and $t_2$ can be decreased to thereby decrease the weight and size of the lens barrel. The use of the flange 7 will provide necessary strength to prevent deformation of these cylinder elements.

If the distance setting ring 2 and intermediate cylinder 3 are to be made of plastic, the use of flange 7 will permit their wall thickness to be substantially the same as $t_1$ and $t_2$ referred to in FIGS. 1 and 2. Accordingly, the weight of the lens barrel can be decreased without increasing its overall size by using plastic materials. This also permits substantial savings in the cost of material and in manufacturing.

While the present invention has been described and illustrated with respect to a certain embodiment which produces satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. An arrangement of cylinder elements for a lens barrel comprising;
   an externally accessible outer cylinder element made of plastic material and having a central axis, an annular ridge carried on an inner peripheral surface of said outer cylinder element;
   an inner cylinder element carried within said outer cylinder element;
   an annular member being separate and independent from said outer and inner cylinder elements and being attachable to said annular ridge with an axis of said annular member being coincident with the central axis of said outer cylinder element, said annular member being made of a material which is stronger than said plastic material; and
   means for fixedly attaching said annular member to said annular ridge with the axis of said annular member being coincident with the central axis of said outer cylinder element.

2. The arrangement of cylinder elements according to claim 1 wherein said annular member has a radial width which is larger than its axial thickness, said annular member being made of metal.

3. The arrangement of cylinder elements according to claim 2 further comprising a third cylinder element carried within said inner cylinder element, and wherein said inner cylinder element comprises an intermediate cylinder connected to said outer cylinder for movement with said outer cylinder, said intermediate cylinder being coupled to said third cylinder element so as to cause movement of said third cylinder element when said second cylinder element is moved with said outer cylinder.

4. The arrangement of cylinder elements according to claim 3 further comprising a rotationally and axially fixed cylinder element having a helically threaded inner cylindrical surface, first and second helical threads provided on the outer and inner cylindrical surfaces respectively of said intermediate cylinder, said first helical thread being in meshing engagement with the helical threaded surface of said fixed cylinder so that movement of said intermediate cylinder is guided by the helical thread of said fixed cylinder when said outer cylinder is manually moved, and wherein said third cylinder element is provided with a helical thread in meshing engagement with said second helical thread of said intermediate cylinder, and means for preventing rotational movement of said third cylinder element so that said intermediate cylinder is moved in an axial direction in response to movement of said outer cylinder.

5. The arrangement of cylinder elements according to claim 4 wherein said outer cylinder comprises a distance setting ring having distance indicia thereon.

6. The arrangement of cylinder elements according to claim 4 wherein said third cylinder element comprises a lens retaining cylinder for retaining a photographic lens element.

7. The arrangement of cylinder elements according to claim 2 wherein said means for attaching said annular member to said annular ridge comprises screws to be threadedly received in said annular ridge.

8. The arrangement of cylinder elements according to claim 7 further comprising a second annular ridge outwardly extending from the outer cylindrical surface of said inner cylinder, said second annular ridge being positioned in side-by-side relation with said annular ridge of said outer cylinder, and wherein said screws extend through said annular ridge of said outer cylinder and are threadedly received in said second annular ridge of said inner cylinder, whereby, said inner cylinder is coupled with said outer cylinder.

9. The arrangement of cylinder elements according to claim 2 wherein said annular member has an outer diameter substantially equal to the inner diameter of said outer cylinder so that its outer circumferential edge comes into contact with the inner cylindrical surface of said outer cylinder.

10. An improved arrangement of cylinder elements for a camera lens barrel includes a first cylinder element made of plastic material and having a central axis, a second cylinder element coupled to and fitted within said first cylinder element for axial and rotational movement therewith, an annular ridge carried on a cylindrical surface of either said first or second cylinder element, said cylinder surface which carries said annular ridge facing a cylindrical surface of the other of said cylinder elements, wherein the improvement comprises an annular reinforcing member separate and independent from said first and second cylinder elements and having a central axis, said annular reinforcing member being attachable to said annular ridge with the central axis of said annular reinforcing member being coincident with the central axis of said first cylinder element for preventing said first cylinder element from deviating from circularity.

11. The improved arrangement of cylinder elements according to claim 10 wherein the radial width of said annular reinforcing member is greater than its thickness and wherein said annular reinforcing member is made of metal.

12. The improved arrangement of cylinder elements according to claim 10 further comprising a third cylinder element fitted into said second cylinder element, and means coupling said second cylinder element to said third cylinder element so that said third cylinder element is moved in response to movement of said second cylinder element.

13. The improved arrangement of cylinder elements according to claim 10 wherein said annular ridge is provided with at least one arcuate slot, and wherein said cylinder element which does not support said annular ridge is provided with a threaded screw hole aligned with said slot, said reinforcing member being attached to said first and second cylinder elements by a screw extending through said slot and secured in said screw hole.

14. An arrangement of cylinder elements for a lens barrel comprising;
a first cylinder element made of plastic material and having a central axis;
a second cylinder element made of plastic material, said second cylinder element being received in said first cylinder element;
an annular ridge integrally provided on a peripheral surface of one of said first and second cylinder elements, said peripheral surface of the cylinder element provided with said annular ridge facing a peripheral surface of the other cylinder element;
annular reinforcing means having a central axis and being attachable to said annular ridge with the central axis of said reinforcing means being coincident with the central axis of said first cylinder element, said reinforcing means being made of metal which is stronger than the plastic material; and
means for fixedly attaching said annular reinforcing means to said annular ridge with the central axis of said annular reinforcing means being coincident with the central axis of said first cylinder element.

15. The arrangement of cylinder elements according to claim 14, wherein said reinforcing means includes an annular member having a radial width which is larger than its thickness, said annular member being made of metal.

16. The arrangement of cylinder elements according to claim 15 wherein said annular ridge is integrally provided on an inner surfce of said first cylinder element and wherein said annular member has an outer diameter equal to the inner diameter of said first cylinder so that its outer circumferential edge comes into contact with the inner cylindrical surface of said first cylinder.

17. The improved arrangement of cylinder elements according to claim 10 wherein said annular reinforcing member has an outer diameter substantially equal to the inner diameter of said first cylinder so that its outer circumferential edge comes into contact with the inner cylindrical surface of said first cylinder element.

* * * * *

UNITED STATES PATENT AND TRADEMARK OFFICE
CERTIFICATE OF CORRECTION

PATENT NO. : 4,297,002
DATED : October 27, 1981
INVENTOR(S) : Tsuneyo Metabi

It is certified that error appears in the above-identified patent and that said Letters Patent are hereby corrected as shown below:

On the title page /75/ should read:
-- [75] Inventor: Tsuneyo Metabi, Sakai, Japan --.

Signed and Sealed this

Eighth Day of February 1983

[SEAL]

Attest:

Attesting Officer

GERALD J. MOSSINGHOFF

Commissioner of Patents and Trademarks